Figure 1:
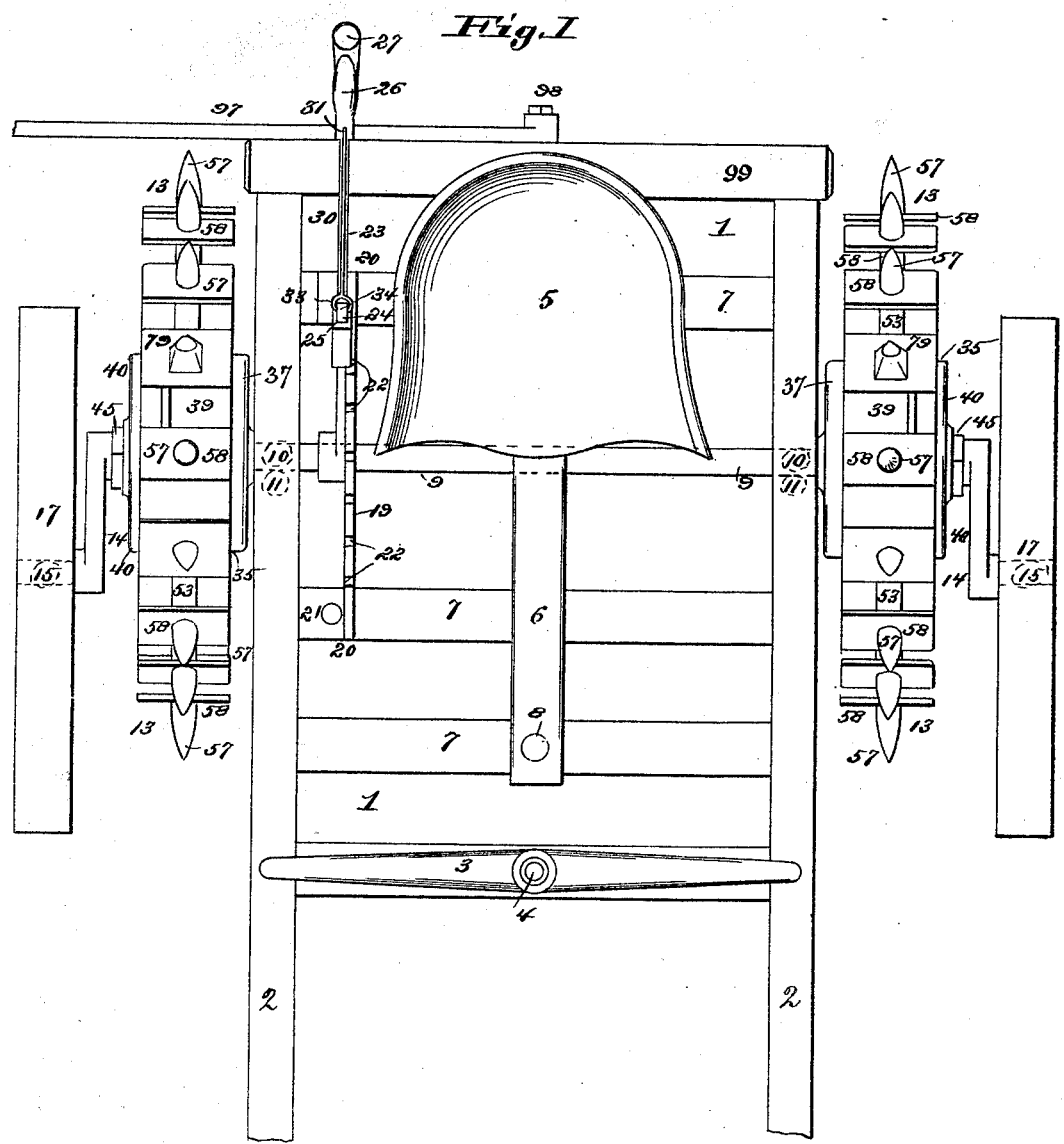

(No Model.)  3 Sheets—Sheet 1.

F. X. CRAFT.
CORN PLANTER.

No. 509,792. Patented Nov. 28, 1893.

Attest:
Geo. E. Cruse
Harry S. Rohrer

Inventor:
Frank X. Craft.
By Knight Bro's. Attys.

(No Model.)  3 Sheets—Sheet 2.
F. X. CRAFT.
CORN PLANTER.
No. 509,792. Patented Nov. 28, 1893.
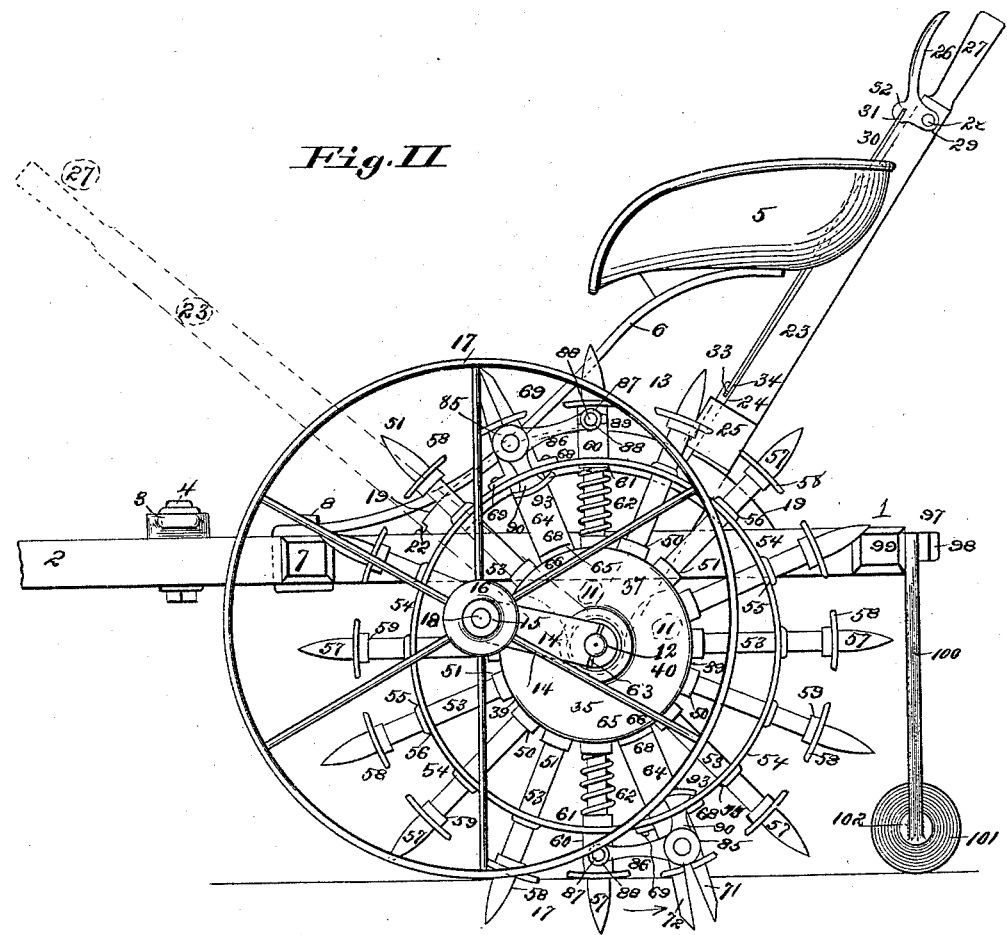
Fig. II.
Fig. III.
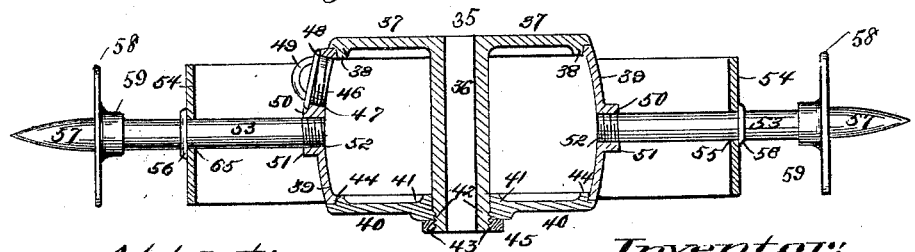
Attest:
George E. Crane
Harry S. Rohrer
Inventor:
Frank X. Craft
By Knight Bros. Attys (No Model.) 3 Sheets—Sheet 3.
F. X. CRAFT.
CORN PLANTER.
No. 509,792. Patented Nov. 28, 1893.
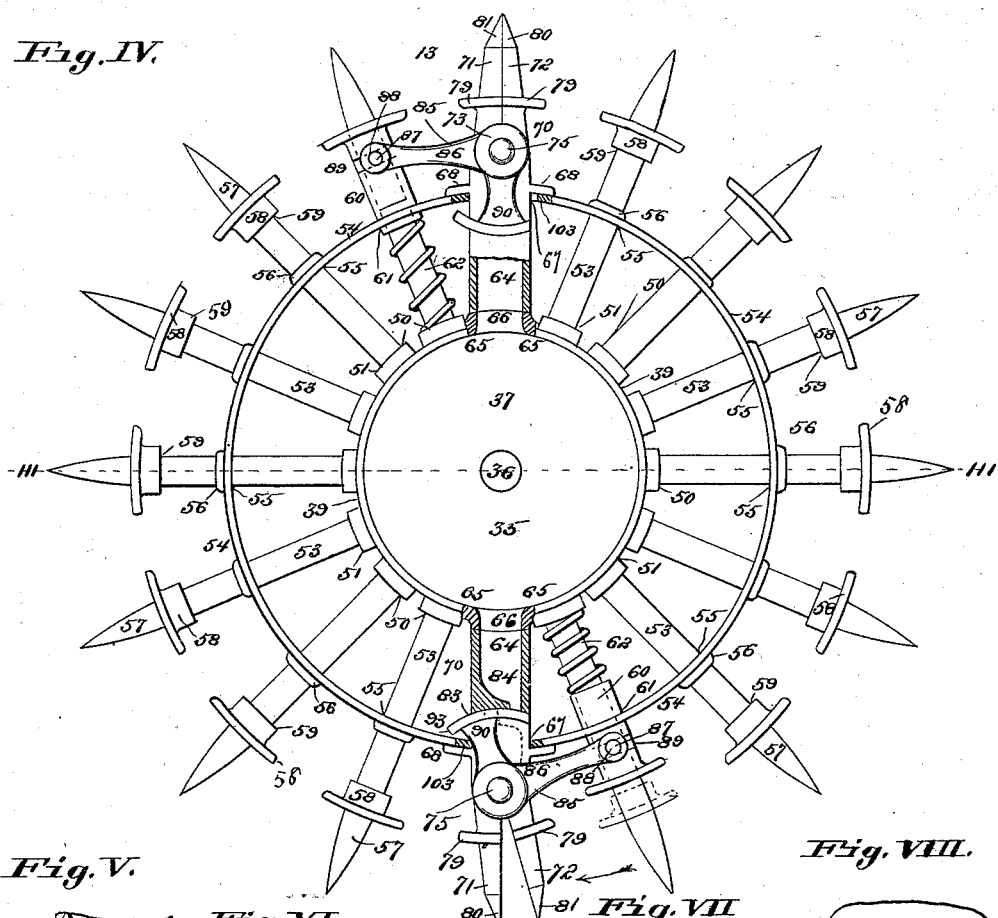
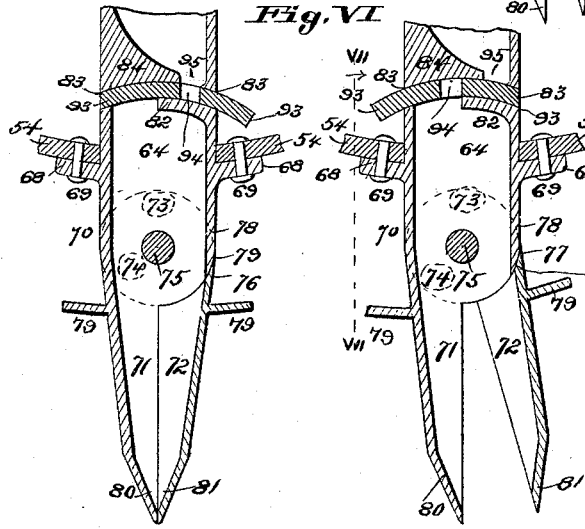
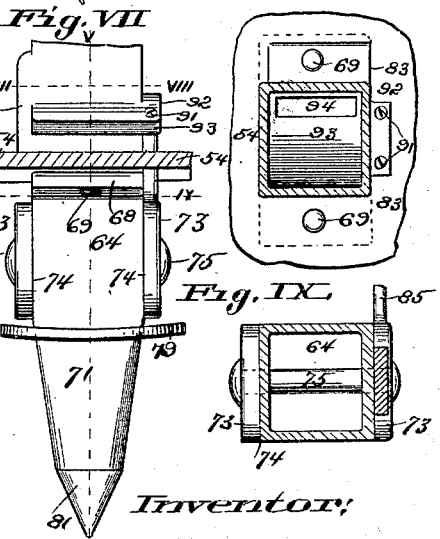

UNITED STATES PATENT OFFICE.

FRANK X. CRAFT, OF CORNING, IOWA.

CORN-PLANTER.

SPECIFICATION forming part of Letters Patent No. 509,792, dated November 28, 1893.

Application filed May 9, 1892. Serial No. 432,259. (No model.)

*To all whom it may concern:*

Be it known that I, FRANK X. CRAFT, of Corning, in the county of Adams and State of Iowa, have invented a certain new and useful Improvement in Corn-Planters, of which the following is a full, clear, and exact description, reference being had to the accompanying drawings, forming part of this specification.

This invention relates to and consists in an automatic corn planter, that measures the location of the hills or seed deposits, and the stipend of seed it deposits to the hill, and that automatically opens and closes its seed vents and the lips of the jaws that discharge said seed; and the invention consists in features of novelty hereinafter fully described and pointed out in the claims.

Figure I is a plan view, and shows the planter wheels on their adjustable crank axle and the lever by means of which said planter wheels are respectively lowered into their working position, and elevated therefrom when not planting. Fig. II is an end elevation in the planting position, and shows one of the push spring tension sleeves on its operative spoke, with its pressure shoe tread on the surface level, by which it elevates said sleeve, and the operative end of the bell-crank rocker arm, to simultaneously rock the seed cup valve of one of the tubular planter spokes from its receptive position to that of its discharge and at the same time opens the pivoted jaw of said planter spoke, which is then embedded in the ground to discharge the seed; it also shows the marker wheel for lining the return course of said planter. Fig. III is an enlarged, horizontal section, taken on line III—III, Fig. IV, and shows two of the inoperative spokes of one of the planter wheels with their stationary surface shoes; it also shows the seed hopper in the hollow hub of said wheel, and the screw-cap that closes the supply mouth of said hopper. Fig. IV is an enlarged, elevation of one of the grain planter wheels, with one end cap of the combined hopper and hub removed and a portion of the feed spouts broken away to show the interior arrangement. Fig. V is an enlarged, vertical, detail section of the feed spout taken on line V—VI, Fig. VII, and shows the reversible seed valve open to hopper and closed to ground. Fig. VI is an enlarged, vertical, detail section of same feed spout, taken on line V—VI, Fig. VII, and shows the reversible seed valve closed to hopper and open to ground. Fig. VII is an enlarged, vertical, transverse, detail section of said seed spout, taken on line VII—VII, Fig. VI, looking in direction indicated by arrow, and shows the automatically adjustable arc-shaped seed valve bearer, screw-seated on its bell-crank operating arm. Fig. VIII is an enlarged, horizontal section, taken on line VIII—VIII, Fig. VII, looking down, and shows a transverse view of the discharge spout of the seed hopper, with the seed valve gage open to hopper; and Fig. IX is an enlarged, horizontal section taken on line IX—IX, Fig. VII, looking down, and shows the feed-spout through which the seed is discharged, and a detail of the bell-crank lever with the fulcrum bolt on which said bell crank lever works.

Referring to the drawings:—1 represents the draft frame of the planter, 2 are the shafts, 3 the single-tree by which said planter is drawn, 4 the draft bolt, 5 the seat and 6 the spring supporting strap on which said seat is mounted, which strap is secured to one of the cross bars 7 of said frame 1 by the bolt or bolts 8.

9 represents the adjustable rocker axle, the journals 10 of which are seated and work in the usual metal bracket bearings 11 that are secured to said frame 1.

12 represents extension journals, outside said bracket bearings 11, on which are loose mounted the grain planter wheels 13, the constituent parts of which will be hereinafter described.

14 represents axle crank arms, which crank arms are fast mounted on the extension journals 12 of the rocker axle 9 and may be secured thereto by the pins 63. On the angle journals 15 of said crank arms, the hubs 16 of the carrier wheels 17 of the machine have their loose bearings 18.

19 is an arc rack frame, the perforate, flange ends 20 of which are secured by bolts 21 to two of the cross-bars 7 of the frame 1. The said surmounting rack-bar is provided with notch key seats 22.

23 represents the operating lever, the shank attachment end of which lever is fast mounted on the adjustable rocker axle 9. 24 is a drop pawl or detent, which works in a socket keeper 25, secured to said lever 23, and which detent in its normal position engages in one or other of said respective notched key seats 22 in accordance with the then position of the operating lever. The said lever by means of its attachment to the adjustable rocker axle 9, on the angle-journals 15 of the crank arms 14, on which the carrier wheels are mounted, governs the respective positions of said crank arms, and through them, respectively depresses the planter wheel to its operative position when said lever is lowered and said detent is seated in one of the rearmost key notches, (see Figs. I and II) and to the contrary when said lever is elevated and said detent is dropped into one of the foremost notches; then in the latter case, said planter wheel is elevated clear of the ground, and the machine can then be driven without planting as will be hereinafter described.

26 represents a thumb trip which is secured to said lever adjacent to its handle 27, by the pivot bolt 28, which passes through the perforate pivot lugs 29 of said thumb trip and through said lever, and 30 is a link rod the upper hook 31 of which engages in the perforate lug 32 of said thumb trip and the lower hook or holder ring 33 of said link engages in its perforate seat 34 in the upper end of said detent. When it is required to change the elevation or depression of the planter wheel as the case may be, the thumb-trip is depressed by means of which the detent is elevated from its key seat, and by means of the released lever the planter wheels are depressed to their planting position or elevated to their inoperative position. Also the degree of depression and elevation can be adjusted thereby, and will be held to said adjustment by the dropping of the detent into that one of its notched seats in the rack which it then surmounts.

I will now describe the construction and operation of the planter wheels, which as stated are mounted on the outer extension journals 12 of the rocker axle 9.

35 represents a combined hollow hub, and seed hopper or drum, which is constituted of the following elements: the tube journal bearer 36 and the flange cap or drum head 37, at one end of said journal bearing and integral therewith, the said drum head having an inwardly projecting circumferential flange 38 around it, on which flange is seated one edge of the drum cylinder 39, of said combined hub and seed hopper.

40 represents the disintegral cap, or drum head that forms the cap or head of the other side of the drum hopper to that closed by the integral cap 37, and said disintegral cap has an opening in the center, around which opening is the enlarged collar 41, the internal screw 42 of which is engaged on the peripheral screw 43 on the end of the journal bearer tube 36, and as said cap, or drum head of the hopper is screwed up thereon, an inwardly projecting, circumferential flange 44, engages within its edge of the drum cylinder 39 which it closes, as the flange 38 of the corresponding head engages with the other edge of said drum cylinder.

45 represents a jam nut, the inner screw of which engages on the end of the peripheral screw 43 that projects beyond the cap or drum-head 40 and said nut jams the screw seat of said cap to prevent its working loose.

46 represents the supply mouth of the seed hopper in the inner screw 47 of which the peripheral screw 48 of the stopper 49 is seated after the insertion of the seed.

50 represents screw threaded spoke sockets in the collar flanges 51, and through the peripheral drum cylinder 39, in which screw-sockets are seated the screw threaded attachment ends 52 of the spokes 53 of the planter wheels. 54 represents the tires of said planter wheels through the perforations 55 in which said spokes are inserted on their way to said screw attachment to said drum cylinder, and in which tires the said spokes are firmly seated and held, being screwed home in said cylinder until their projecting integral collars 56 are firmly gripped against said tires. 57 represents the points of said spokes and 58 are flanged shoes, the socket openings 59 in which shoes and their flanges are seated on said spokes, and there tightly secured at the required distance from said points to regulate the tread of the shoes of said spokes on the surface of the ground. 60 represents spring tension sleeve shoes that are loose seated and work on two of said spokes, on which said stationary shoes 58 are dispensed with. The said sleeve shoes work in enlarged perforations 61 in the tires. 62 represents push spiral springs, which springs are respectively seated around said two spokes on which said sleeve shoes 60 work between said shoes and the collar flanges 51 of the drum cylinder in which said spokes are screw seated.

64 represents the hollow feed spouts of which there are two in each planter wheel and which feed spouts respectively take the place that would otherwise be occupied by two of the spokes, and the expanded heels 65 of said feed spouts are seated within an enlarged opening 66 in the drum cylinder of the hopper, the said heels extending on either hand from one socket flange to another of the next neighboring spokes. The said feed spouts pass through correspondingly large openings 67 in the tire, and the broad integral flanges 68 that project laterally from said feed spouts are securely attached to the tire by the rivets or bolts 69. 70 represents the main, integral portions of said feed spouts, forming the whole inclosure of the same down to the integral jaws 71, connected with which are the gaping jaws 72. The circular jowls or jaw cheeks 73 of the bell crank lever 85 fit loosely alongside the cheeks 74 of said integral jaws, and both jaws are pivotally secured together by the rivets or bolts 75. The upper, concave edges 76 of said movable jaws between their jowls, fit and work loosely against the convex edges 77 of the integral pendent beaks 78, which form the stationary initial corresponding elements to said movable jaws.

79 represents the duplex buffer shoes that project integrally from the jaws 71 and 72, and as do the flange shoes 58 on the spokes, the said shoes serve as buffer stays to tread the surface of the ground, and determine the depth of insertion of the points of said spokes and of the pointed lips 80 of the integral jaws and 81 of the movable jaws of the feed spouts.

82 represents an inwardly projecting flange of a concave arc form that integrally surmounts said pendent beaks 78 of said feed chutes 64, and 83 is an arc curved slot that passes clear through the feed chute above said inwardly projecting flange on the front side of the feed chute, and which arc slot passes clear through said chute, beneath a rearwardly and inwardly projecting lug or flange 84 that is integral with the rear immovable jaw of said feed chute.

85 represents the bell-crank levers, which automatically operate the seeding device of the feed chutes. Said bell crank levers have their fulcrum seats on the aforesaid bolts 75 on which the movable jaws pivot, and the operative or drive arms 86 of said bell crank levers are secured by the self-adjusting bolts 87, to the aforesaid spring tension sleeve shoes 60; which bolts have their perforate seats 88 in the operative ends of said bell-crank levers and engage and slide in the slots 89, in said sleeve-shoes.

90 represents the operated or driven arms of the bell-crank levers, to which arms are secured by screw-bolts 91, the projecting lugs 92 of the arc shaped, reversible- rocker seed valves 93, which reversible valves by the automatic action of said bell crank levers under the impulse of the spiral springs 62 on the sleeve shoes 60, are thereby rocked to and fro, so as to bring their open combined seed ports and measures 94 alternately into coincidence with the delivery port 95 of the feed spout, when said reversible valves are open to hopper, as shown in Fig. V, when in their normal positions to receive and measure the quantity or modicums of seed for their respective corn-hills, and again, by rocking said seed measures of said reversible valves under the surmounting flange lugs 84 and past the underlying flange lugs 82, the said measures are closed to hopper and open to ground, as shown in Fig. VI, so as to cast the seed that they had previously measured into the delivery jaws of said feed spout, the moving jaws of which are simultaneously automatically opened by the same action of the bell crank levers that operates the reversible seed valve.

96 represents a reinforce, integral extension of the inside of the feed spout, which integral extension reinforces said feed spout against the weakening effect of the arc curve slot 83.

103 are the slots in the tires 54 in which the arms 90 of the bell-crank levers work.

97 represents the check rower bearer shaft, which shaft is pivotally secured by the bolt 98 to the heavy rear cross bar 99 of the frame 1.

100 represents the pendent rod which carries the marking roller 101, which roller is mounted on the journal pin 102. The said roller marks the next succeeding row to be planted equidistant and parallel to those previously planted.

The operation of the automatic seed measuring and planting devices is as follows:—
The normal condition of the spring tension sleeve shoes 60, is projected outward by the spiral springs 62 carrying with them the drive arms 86 of the bell crank levers 85, thereby keeping the movable jaws of the feed spouts closed, and the reversible seed measuring and distributing valves open to the hopper to receive and measure the quantity or modicum of seed for one hill each. This position is maintained while the spokes that carry said spring tension sleeve shoes are out of the ground, being held thereto by said push springs 62. As the grain planter wheels revolve (see Figs. I, II and IV) one of the feed planter chutes enters the ground ahead of the adjoining spoke that carries its spring tension commander sleeve, and therefore said feed spout has its jaws tight closed, for the flange sleeve shoe 58 has not yet pressed the ground, and consequently the spiral push springs have full command through said sleeve shoes of the bell crank levers, and the seed measures being at the same time in free communication with the hoppers which then surmount them, have received their quantity or modicum of seed. The points 57 of the said spokes 53, then enter the ground, and their flanged shoe sleeves 58 pressing against the same, push back the spiral springs, and thus change the position of the bell-crank levers from that shown in the upper portions of the planter wheels, (see Fig. II and IV) to that of their lower portions. The said change of the bell-crank levers has the two-fold effect of changing the positions of the reversible seed valves from having their measures open to hopper to receive their quantity or modicum of seed (see Fig. V) to that of being open to ground for the discharge of said seed (see Fig. VI), and at the same time opens the movable jaws 72 of the feed spouts (which feed spouts always travel ahead of their commander spokes,) the said open jaws thereby dropping the seed in the hills, before their ascent from the ground. If in some conditions of the soil the jaws of the feed spouts after planting their seed, should leave any grains thereof uncovered, the next succeeding spokes, (which only stir the surface of the ground as their flanged shoes being immovable, buffer stay their farther entrance) serve to cover said few stray grains, if any such there be.

It will be seen that my corn planter being altogether automatic in its action in both measuring the seed, and in dropping and planting the same, as well as in check rowing for subsequent planting, the whole work is done with mechanical precision, and the accidental and careless, but many times unavoidable divergence in the location of the hill and in the amount of seed planted is thereby avoided.

I do not confine myself to the positions shown of the bell-crank levers, the push springs and pressure shoes, and the reversible feed valves, as it is evident that the same may be elevated or lowered on the feed spouts 64 and on their pioneer spokes 53, without any departure from the essential features of this invention.

One of the numerous elements of my invention that is also of special importance is the pointed ends of the spokes and of the feed chutes, in conjunction with their flanged buffer shoes which flanged shoes always definitely determine the depth to which said spokes and feed chutes enter the ground. Now it will be seen that said recurring spoke and feed spout points (unlike a ground surface tire) register the exact progress of the planter wheels, definitely, like cogs in a rack, so that the distance between hill and hill is ever uniform all across the field, and the locations of the hills in relation to each other in corresponding rows, are checked on uniform line with each other. The rows in each direction being thus in perfect line, with no zigzag hills out of line, the work of tending is not only facilitated but it can be much more perfectly effected. Also if the corn is cut up by machine, that work is also more easily effected, so that the machine precision in planting produces after advantageous effects both in the work and product of the crop all along the way.

The objectionable lack of correct registry of the surface tire wheels of former corn planters is largely occasioned by their wheels having no regularly recurring grip hold, like the points of my spokes, of the surface of the ground over which they travel and no buffer stay like the flanged shoes of my spokes to exactly determine the depth of their insertion. Therefore, on one hand their tires in soft or moist portions of the field, and on the other hand mounting clods or hard gravelly ground, make no even register, and the hills are in consequence planted in zigzag out of line. My registering pointed and flange shod spokes and feed chutes overcome this difficulty.

I have shown and described two feed chutes to each planter wheel, with the same number of adjacent pioneer commander spokes with their sliding sleeve shoes, spiral push springs and bell-crank drive levers with their reversible seed valves, but I do not confine myself to two of said parts for the number may be changed to accord with planter wheels of either increased or reduced diameter, or to be suitable for planting beans or other small plant seeds in which the hills are required to be closer together.

I claim as my invention—

1. In a corn planter, the combination of the feed spout 64 having a fixed jaw 71 and a movable jaw 72, the bell-crank lever 85 having its fulcrum on the pivot of the movable jaw, provided with arms 86, 90, the spoke 53 having a flanged spring sleeve to which one of the arms is connected and a seed-valve secured to the other arm; substantially as described.

2. In a corn planter, the combination of a feed spout having the automatically adjustable jaws 71, 72, the duplex buffer flange shoes 79, the bell-crank lever 85 that governs the opening and closing action of said jaw, the said lever having the drive arm 86, and the oscillatory arc moving driven arm 90, the bolt that pivotally connects the jaws and bell-crank lever, the arc curved reversible rocker seed valve 93, mounted on said arm 90 and operated by said bell-crank, said valve provided with the slotted valve seat 83, the flange lug 84 that surmounts said valve, the spoke 53 of the planter wheel that works as a pioneer spoke next ahead of said feed spout, the buffer flange sleeve shoe 60 that works on said spoke, the spiral push spring 62, that drives said sleeve shoe, the said sleeve provided with the slot 89, and the self-adjusting bolt 87, that connects the drive arm 86 of the bell-crank to the inclosing edges of said slot in said sleeve; substantially as described.

3. In a corn planter, the combination of the feed spout having the integral jaw 71, the movable jaw 72, the pivotal attachment 75 of said jaws, and the duplex buffer flange shoes 79, the bell-crank lever 85 having the operating arm 86 and the oscillatory arc moving driven arm 90, and the reversible arc curved seed valve 93 mounted thereon; said valve being provided with the arc curved valve seat 83 and having the measure seed port 94; substantially as described.

4. In a corn planter, the combination of the feed-spout having the automatically adjustable jaw, the duplex buffer flange shoes 79 the bell-crank lever that governs the opening and closing action of said jaw, the bolt that pivotally connects the jaws and bell-crank lever, the arc curved reversible rocker seed valve carried by said bell-crank, the spoke 53 of the planter wheel, the sleeve shoes 60, that work on said spoke, the spiral push spring 62 the said sleeve provided with the slot 89, and the self-adjusting bolt 87 that connects the drive arm 86 of the bell-crank to said slot in said sleeve; substantially as described.

5. In a corn planter, the combination of the feed spout, having the jaws 71 and 72, the bell-crank lever, the jowls of said jaws and lever, the bolt 75 that connects said jaws, jowls and bell-crank, the pioneer commander spoke 53, the sliding sleeve shoe on said spoke, the pivotal connection of said bell crank lever to said sleeve, and the push-spring 62; substantially as described.

6. In a corn planter, the combination of the planter-wheel 13 the automatically adjustable feed spout having the jaws 71 and 72, the spokes 53, and the automatically driven bell-crank lever that adjusts the jaws of said feed spout; substantially as described.

7. In a corn planter, the combination of the planter wheel having the combined hollow hub and seed hopper 35, the feed spout 64 having the integral jaw 76 and provided with the valve seat slot 83, the said feed spout connected with said hopper hub, the rearwardly inward inclined flange lug 84, the integral pendent beak 78, the inwardly projecting arc flange 82, the movable jaw 72, the bell-crank lever, the pivoted connection of said bell-crank lever and said jaws, and the reversible seed valves 93, provided with the measure seed ports 94; the spoke, and spring sleeve substantially as described.

8. In a corn planter, the combination of the planter wheel, the rocker axle on which said wheel is mounted, the crank arms 14 bearing their journals 15 on said axle, the carrier wheels mounted on said journals, the said planter wheels having the combined hub and seed hopper 35, the pointed spokes 53, the flanged buffer shoes 58, the tires 54, the push springs 62, the slide sleeve shoes 60, the feed-spout 64, having the integral jaw 71, and the automatically adjustable jaw 72, the bell crank lever, the pivotal connection of said lever and said jaws, the slide bolt-connection of the drive arm of said bell-crank to said sleeve shoe, the said bell crank having the driven angle arm 90, the reversible seed valve 93, having the projecting perforate lug 92, the screw bolts 91 that are seated in the perforations of said lug and secure said reversible valve to said driven arm 90 of said bell crank and the said valve provided with the measure seed port 94; substantially as described.

9. In a corn planter, the combination of the sectional, combined hollow hub and seed hopper of the planter wheel, the said hub and seed hopper constituted of the flange cap or drum head 37, the inwardly projecting flange 38, the drum cylinder 39, the cap or drum head 40, the collar flanges 51, the seed supply mouth 46, the screw cap that covers said mouth, and the spokes and feed spout secured to said combined hollow hub and seed hopper; substantially as described.

10. In a corn plow, the combination frame 1, the rocker axle 10, the bracket bearings 11, in which said axle is mounted, the planter wheels mounted on said axle, the crank arms 14 of said axle, the angle journals 16 on said crank arms, the carrier wheels 17 mounted on said journals, the operative lever that adjusts the elevation and depression of said planter wheel, the check rower bearer shaft 97, the pivot bolt 98 that secures said shaft to said frame 1, the pendent rod 100, the journal pin 102 and the marking roller 101, mounted on said journal pin; substantially as described.

11. In a corn planter, the combination of the sectional combined, hollow hub and seed hopper of the planter wheel, the feed chute 64, the duplex buffer shoes 79, the spokes 53 secured in said hub, the tire 54 through which said spokes pass, the said spokes having the registering points 57, the flanged buffer shoes 58, the flanged sleeve shoes 60, the said registering points 57 of the spokes and 81 and 82 of the feed chute, and the said buffer flange shoes 58, 60 and 79 arranged to effect a registry of uniform distance in spacing between hill and hill; substantially as described.

FRANK X. CRAFT.

In presence of—
 BENJN. A. KNIGHT,
 SAML. KNIGHT.